United States Patent
Kondo et al.

(10) Patent No.: US 10,370,008 B2
(45) Date of Patent: Aug. 6, 2019

(54) VEHICLE AIR-CONDITIONING SYSTEM AND RAILROAD VEHICLE EQUIPPED WITH SAME

(71) Applicant: KAWASAKI JUKOGYO KABUSHIKI KAISHA, Kobe-shi, Hyogo (JP)

(72) Inventors: Koki Kondo, Kobe (JP); Keiji Sakagawa, Akashi (JP); Ryosuke Mitani, Akashi (JP); Kazuto Nakai, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 195 days.

(21) Appl. No.: 14/654,196

(22) PCT Filed: Dec. 17, 2013

(86) PCT No.: PCT/JP2013/083708
§ 371 (c)(1),
(2) Date: Jun. 19, 2015

(87) PCT Pub. No.: WO2014/103789
PCT Pub. Date: Jul. 3, 2014

(65) Prior Publication Data
US 2015/0344045 A1    Dec. 3, 2015

(30) Foreign Application Priority Data

Dec. 27, 2012 (JP) .................................. 2012-285030

(51) Int. Cl.
*B61D 27/00* (2006.01)
*B60H 1/00* (2006.01)
*B60H 1/24* (2006.01)

(52) U.S. Cl.
CPC ..... *B61D 27/0018* (2013.01); *B60H 1/00371* (2013.01); *B60H 1/245* (2013.01)

(58) Field of Classification Search
CPC .. B60H 1/00271; B60H 1/00; B60H 1/00021; B60H 2001/00185; B60H 2001/00192;
(Continued)

(56) References Cited

U.S. PATENT DOCUMENTS 2,383,423 A * 8/1945 Steins ................ B60H 1/00371
454/158
4,742,692 A * 5/1988 Yoneda ............. B60H 1/00371
454/105
(Continued)

FOREIGN PATENT DOCUMENTS

EP    000115059 A2 *   8/1984
JP    H02-045261 A     2/1990
(Continued)

OTHER PUBLICATIONS

JP2007216962MT, machine translation of JP2007216962A.*
(Continued)

*Primary Examiner* — Gregory L Huson
*Assistant Examiner* — Elizabeth M. May
(74) *Attorney, Agent, or Firm* — Oliff PLC

(57) ABSTRACT

An air-conditioning system in vehicle is installed in a vehicle in which a vehicle body center position and an aisle center position are different, and has an air conditioner. The air-conditioning system in vehicle has first and second outlets arranged on both sides of the vehicle in a vehicle width direction and discharging conditioned air having substantially the same air volume into an interior, and an air regulating member setting a merging position of air flows discharged from the first and second outlets to the position where the line segment connecting the vehicle body center position and the aisle center position is internally divided at a ratio of between 20:80 and 86:14.

12 Claims, 9 Drawing Sheets

(58) Field of Classification Search
CPC ............... B60H 1/00371; B61D 27/00; B61D 27/0018; B61D 27/009; B61D 27/0036; B61D 27/0072; B61D 37/00; B61D 37/003

See application file for complete search history.

(56) References Cited

U.S. PATENT DOCUMENTS

| | | | | |
|---|---|---|---|---|
| 4,951,560 A | * | 8/1990 | Setan | B61D 1/06 105/340 |
| 2014/0295746 A1 | * | 10/2014 | Chagnon | B60H 1/00371 454/75 |

FOREIGN PATENT DOCUMENTS

| | | | | |
|---|---|---|---|---|
| JP | H09-30241 | A | | 2/1997 |
| JP | H11-151925 | A | | 6/1999 |
| JP | 2004-351951 | A | | 12/2004 |
| JP | 2007-153159 | A | | 6/2007 |
| JP | 2007-216962 | A | | 8/2007 |
| JP | 2007216962 | A | * | 8/2007 |
| JP | 2008-132982 | A | | 6/2008 |
| JP | 2008132982 | A | * | 6/2008 |
| JP | 2008-195117 | A | | 8/2008 |
| JP | 2009-012527 | A | | 1/2009 |
| JP | 4206298 | B2 | | 1/2009 |
| JP | 2009-113656 | A | | 5/2009 |
| JP | 2014040151 | A | * | 3/2014 |

OTHER PUBLICATIONS

JP2014040151MT, machine translation of JP2014040151A.*
EP0115059MT, machine translation of EP0115059A2.*
Mar. 25, 2014 International Search Report issued in International Application No. PCT/JP2013/083708.
Aug. 11, 2014 International Preliminary Report on Patentability issued in International Patent Application No. PCT/JP2013/083708.

* cited by examiner

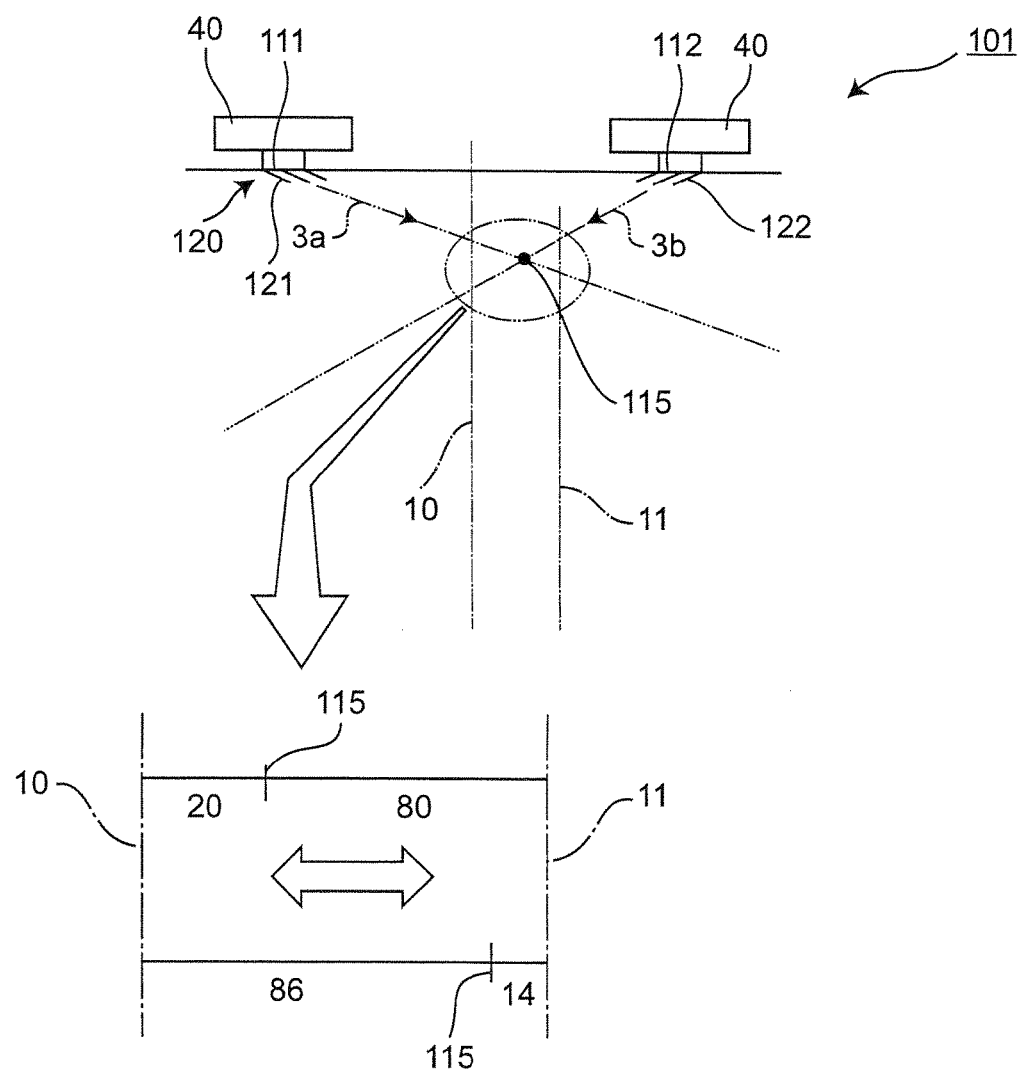

VEHICLE AIR-CONDITIONING SYSTEM AND RAILROAD VEHICLE EQUIPPED WITH SAME

TECHNICAL FIELD

The present invention relates to an air-conditioning system in vehicle installed in a large-sized transportation, such as a railcar, an aircraft, a ship, and a bus, and relates to a railcar equipped with the same.

BACKGROUND ART

In air-conditioning in e.g., a railcar, an air conditioner sucks interior air of a passenger car through suction openings, and discharges temperature-regulated air as a conditioned air into an interior of the passenger car through outlets provided on the right and left sides of a carbody or on the right and left sides of a ceiling of the interior. At this time, each of the conditioned air discharged from the outlets on the right and left sides of the carbody into the interior is merged at a central part in a passenger car width direction and becomes descending air flow at the central part to be blown.

When the descending air flow is generated at the central part, any problem is not caused in a passenger car with an aisle located at the central part of the passenger car. However, in a passenger car in which the number of seats differs between the right and left sides, for example three-row seating and two-row seating, the descending air flow is blown on the passenger sitting on the aisle seat in the three-row seating side. An air flow giving uncomfortable feeling to a passenger is called as a "draft". In order to prevent the "draft" from occurring in the interior, it is necessary to reduce the air speed of the conditioned air to a certain extent or less in the interior.

As a conventional technique for preventing the occurrence of the "draft", technique of Patent Document 1 has been disclosed, the technique assuming the passenger car whose seating capacity differs between the right and left sides like e.g., three-row seating and two-row seating. The invention in the Patent Document 1 suggests the technique that a ratio of air volume discharged from the right and left sides is optionally regulated to generate the descending air flow above the aisle located different from the central part. The invention of the Patent Document 1 assumes that it will be best when the ratio of air volume between the three-row seating and the two-row seating is set in 54:46.

PRIOR ART DOCUMENT

Patent Document

Patent Document 1: JP 4206298

SUMMARY OF THE INVENTION

Problems to be Solved by the Invention

In the above conventional technique, in order to regulate the air volume discharged from the right and left sides, it is necessary to adopt a configuration or method in the following 1 or 2:

1. Configuration of duct differs between the right and left sides; or
2. In a case that configuration of duct is the same on the right and left sides, A) when one air blower with respect to the right and left ducts blows air, a resisting member, such as a restrictor, is added to the duct or the outlet on the side whose air volume is to be reduced, B) when two or more air blowers with respect to the right and left ducts are used by being driven by one motor, air blowers with different performances at the same rotation frequency are used, rotation frequencies of air blowers are differentiated while using the air blowers with the same performance at the same rotation frequency, or a resisting member, such as a restrictor, is added to the duct or the outlet on the side whose air volume is to be reduced, C) two or more air blowers with respect to the right and left ducts are used by being driven by two or more motors.

However, the above configurations and methods for regulating the air volume discharged from the right and left sides cause the following problems.

That is, when the different ducts or air blowers on the right and left sides are used, the number of types of air-conditioning manufacturing components can be increased, and erroneous mounting with the right and left sides reversed during installation can be caused. In addition, when the resisting member, such as a restrictor, is added, noise can be caused. Further, when the rotation frequencies of the air blowers are differentiated while two air blowers are driven by a single shaft of one motor, a speed changer is necessary. Further, when two or more motors are used, the number of devices is increased. In each case, an increase of the number of components and the installation space, or the like may be considered.

All of these are disadvantageous in cost, performance, and installation space.

The present invention has been made to solve such problems, and an object of the present invention is to provide an air-conditioning system in vehicle, which has a configuration that air volume discharged from the right and left sides in the vehicle width direction are substantially the same, and that the conditioned air is not directly blown onto the passengers so that uncomfortable feeling in them can be prevented; and a railcar equipped with the air-conditioning system.

Means for Solving the Problems

To achieve the above object, the present invention has the following features.

That is, an air-conditioning system in vehicle of a first aspect of the present invention has an air conditioner sucking interior air of the vehicle and discharging conditioned air regulated in temperature into the interior of the vehicle, the vehicle having a vehicle body center position and an aisle center position, the vehicle body center position and the aisle center position being different from each other by the difference of the number of seat rows on the right and left sides across an aisle in a vehicle width direction, the air-conditioning system comprising:

a first outlet and a second outlet configured to be arranged at left-right symmetric positions in the vehicle width direction with respect to the vehicle body center position, each of the first outlet and a second outlet being configured to discharge the conditioned air with substantially the same air volume into the interior; and an air regulating member configured to set a merging position that air flows discharged from the first outlet and the second outlet are joined to a position that a line segment connecting the vehicle body center position and the aisle center position is internally divided.

The first outlet and second outlet arranged on both sides of the vehicle body in the vehicle width direction discharge substantially the same air volume into the interior. Therefore, any disadvantage is not caused in cost, performance, and installation space with respect to the ducts and air blowers. In addition, in the vehicle body in which the vehicle body center position and the aisle center position are different in the vehicle width direction, an air flow running from the vehicle body center toward the aisle center has a tendency to be stronger if both air flows discharged from the first outlet and second outlet are simply merged above the aisle center position. As a result, the stronger air flow may be blown onto the passenger in the aisle seat. However, in the first aspect, by providing the air regulating member, the air regulating member can arrange the merging position of the air flows discharged from the first outlet and second outlet to the position where the line segment connecting the vehicle body center position and the aisle center position is internally divided. The position is, for example, slightly toward the vehicle body center from the aisle center. Therefore, the conditioned air is not directly blown onto the passengers sitting on the aisle seats in the right and left sides across the aisle, so that uncomfortable feeling in them can be prevented.

In addition, the railcar of the second aspect of the present invention has the air-conditioning system in vehicle of the first aspect.

Effects of the Invention

According to the air-conditioning system in vehicle of the first aspect and the railcar of the second aspect of the present invention, in a configuration that air volumes discharged from the right and left sides in the vehicle width direction are substantially the same, the conditioned air is not directly blown on the passengers so that uncomfortable feeling in them can be prevented.

BRIEF DESCRIPTION OF THE DRAWINGS

FIG. 2 is a diagram explaining the operation of regulation plates illustrated in FIG. 1.

EMBODIMENTS OF THE INVENTION

Figure 1:
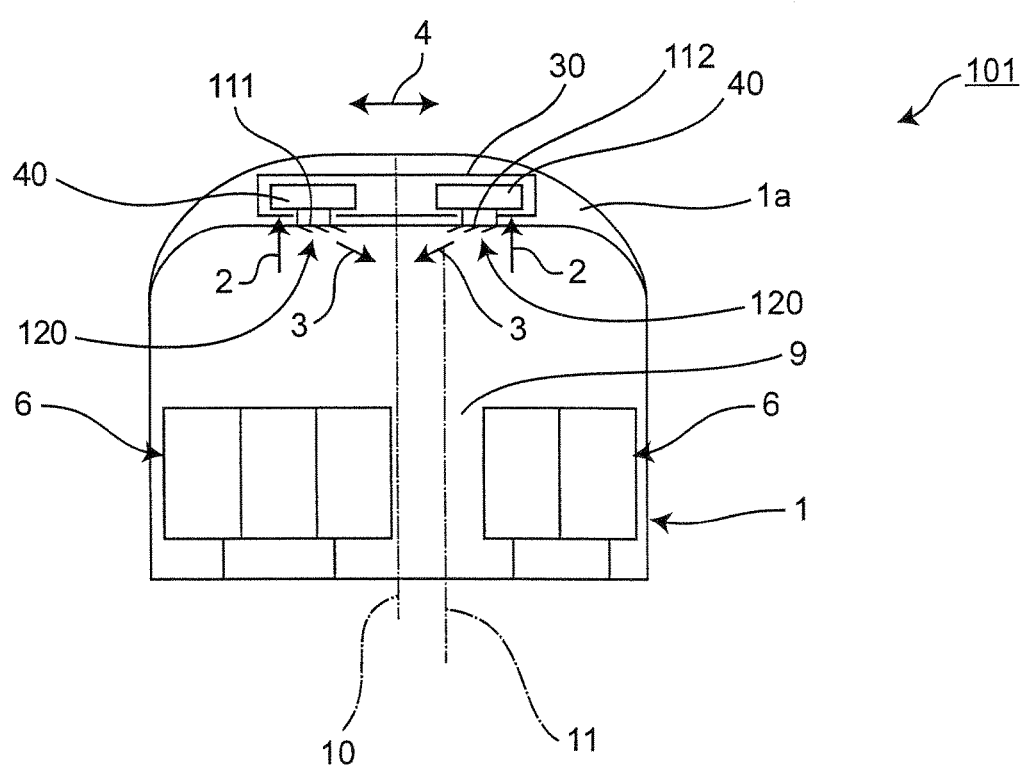
FIG. 1 is a diagram illustrating the schematic structure of an example of an air-conditioning system in vehicle in a first embodiment.

An air-conditioning system in vehicle and a railcar equipped with the air-conditioning system according to embodiments will be described below with reference to the drawings. In the drawings, identical or similar components are indicated by the same reference numerals. In addition, in order to avoid the following description from being unnecessarily repeated and in order to facilitate the understanding of those skilled in the art, the detailed description of already well-known matters and the repeated description of substantially the same structures are omitted sometimes. Further, the contents of the following description and the accompanying drawings do not intend to limit the subject matter in claims.

In the embodiments described below, a railcar is adopted as a vehicle body equipped with the air-conditioning system in vehicle. However, the air-conditioning system in vehicle according to the embodiments is not limited to apply to the railcar, and is applicable to a vehicle in a large-sized transportation, such as an aircraft, a ship, and a bus.

Referring to FIGS. 8 to 13, the outline of the entire structure of each of conventional typical air-conditioning systems 50 and 51 of a railcar 1 will be described.

Figure 10:
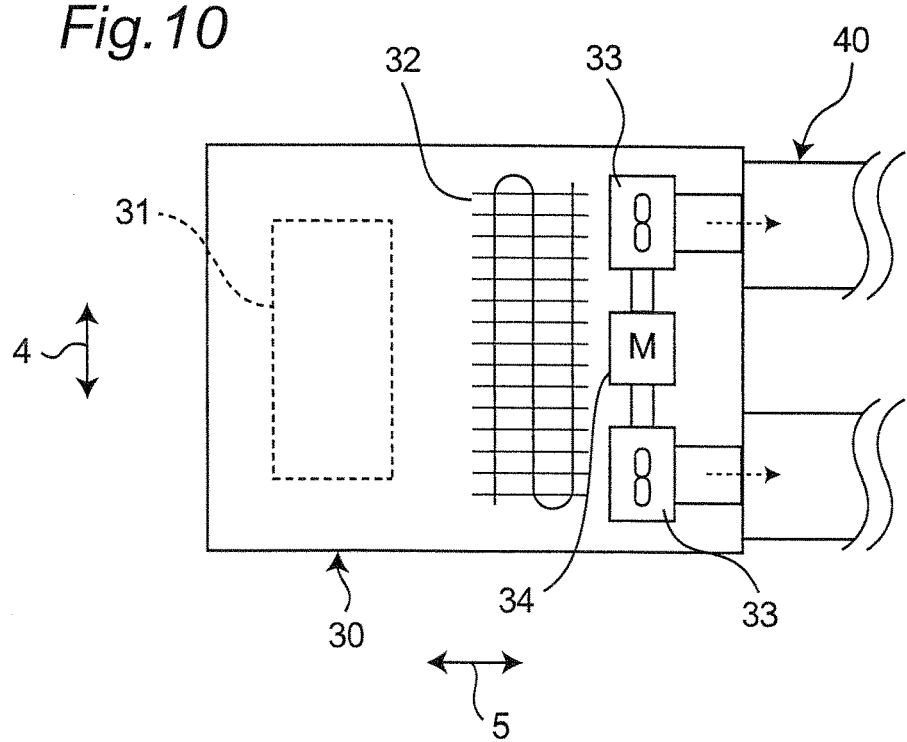
FIG. 10 is a plan view of the schematic structure of an air conditioner illustrated in FIG. 8.

The air-conditioning systems 50 and 51 are systems which maintain the temperature of an interior of the railcar constant by cooling and heating, and roughly have an air conditioner 30 and a duct 40. The air conditioner 30 sucks interior air 2 of the railcar, and discharges conditioned air 3 to which the interior air is regulated in temperature to the interior. As illustrated in FIG. 10, the air conditioner 30 has a suction opening 31 for the interior air 2, a heat exchanger 32 for temperature regulation, blowers 33, and a motor 34 for driving the blowers. Here, the structure of the air conditioner 30 is not limited to the above one as long as it satisfies the above functions thereof.

Figure 9:
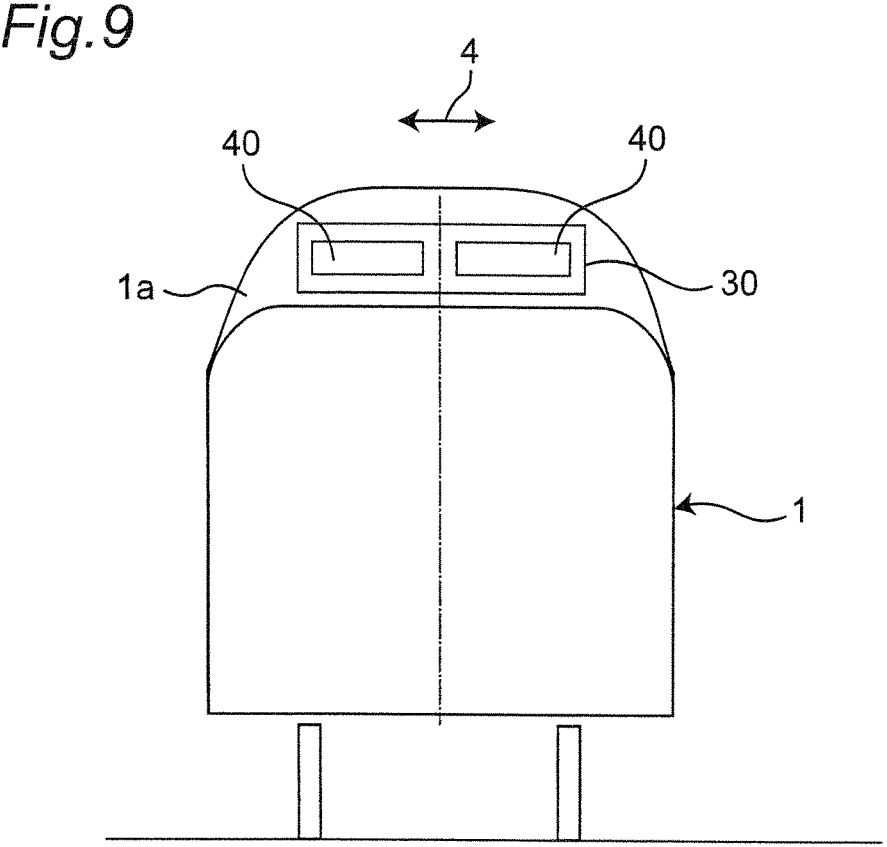
FIG. 9 is a cross-sectional view taken along cross section "A" indicated in FIG. 8.

The duct 40 is a hollow tubular body connected to the air conditioner 30. As illustrated in FIG. 9, the ducts 40 are mounted along a vehicle length direction 5 on the right and left sides of a carbody of the railcar in a vehicle width direction 4, and have outlets which discharge the conditioned air 3 into the interior of the railcar. Each shape of the ducts 40 is not limited in a particular one. For example, a longitudinal cross-sectional area of the duct at a position in the vehicle length direction 5 may be changed depending on a distance from the air conditioner 30. In this case, each of the longitudinal cross-sectional areas in one duct and the other duct is preferably changed such that a sum of the longitudinal cross-sectional area in one duct 40 connected to one air conditioner 30 and the longitudinal cross-sectional area in the other duct 40 connected to the other air conditioner 30 is maintained substantially constant at every distance from the air conditioner.

Figure 8:
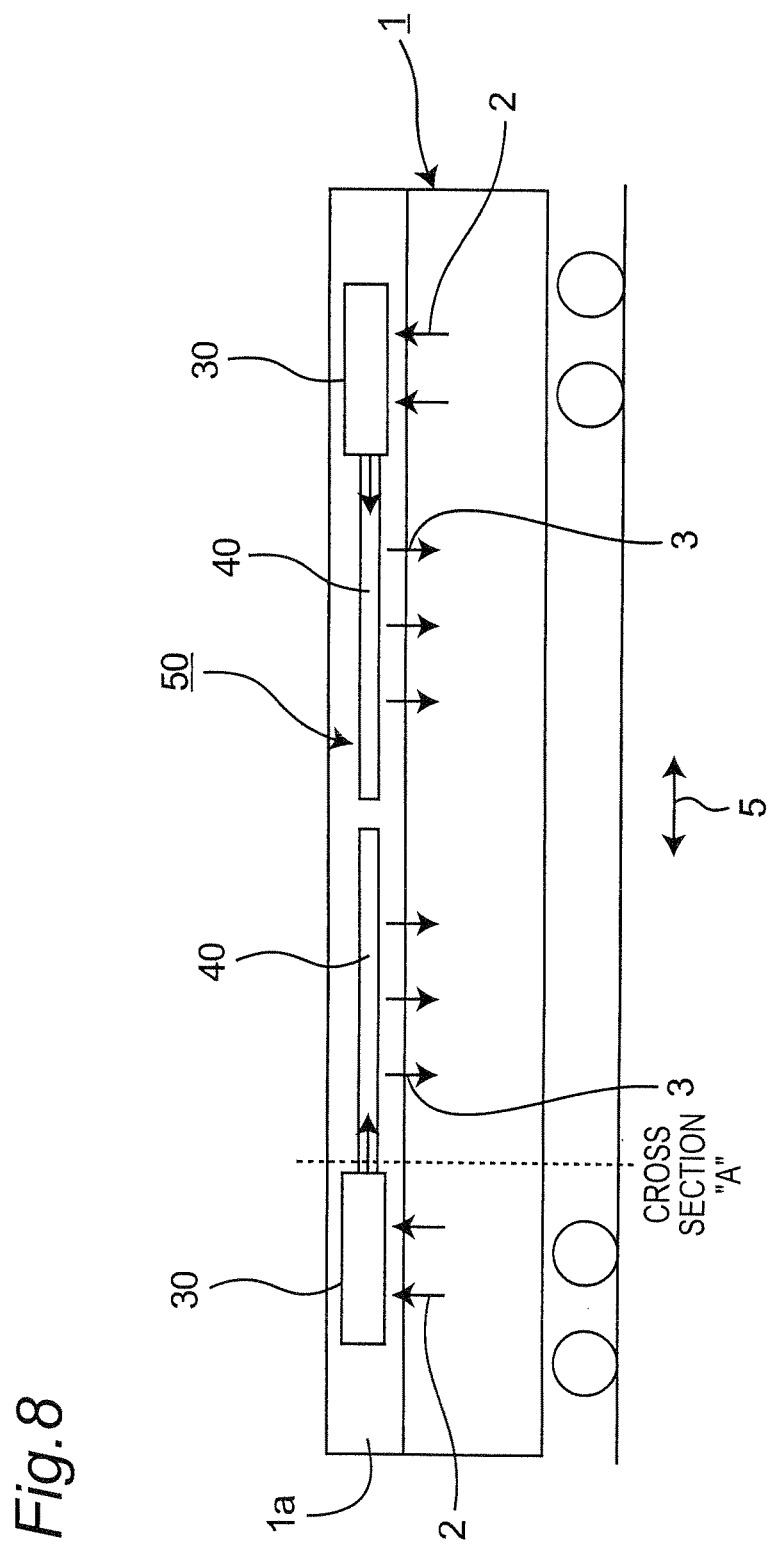
FIG. 8 is a diagram illustrating the schematic structure of an example of a conventional typical air-conditioning system in a railcar.

FIG. 8 illustrates an example of the air-conditioning system 50 in which air conditioners 30 and the ducts 40 are arranged in a ceiling part 1a of the interior in the railcar 1. In FIG. 8, a set of the air conditioner 30 and the duct 40 is provided at each of the front and rear ends of the railcar 1, and the ducts 40 are separated at the front and rear sides in the vehicle length direction 5. However, the ducts 40 may be arranged over the entire length of the railcar in the vehicle length direction 5, and the air conditioner 30 may be arranged toward the center in the vehicle length direction 5. In addition, the air conditioner 30 can be provided at either one of the front end and rear end to arrange the ducts 40 over the entire length of the railcar, or the air conditioner 30 can be provided toward the center in the vehicle length direction 5 to arrange the ducts 40 across the air conditioner 30 in the vehicle length direction 5.

Figure 11:
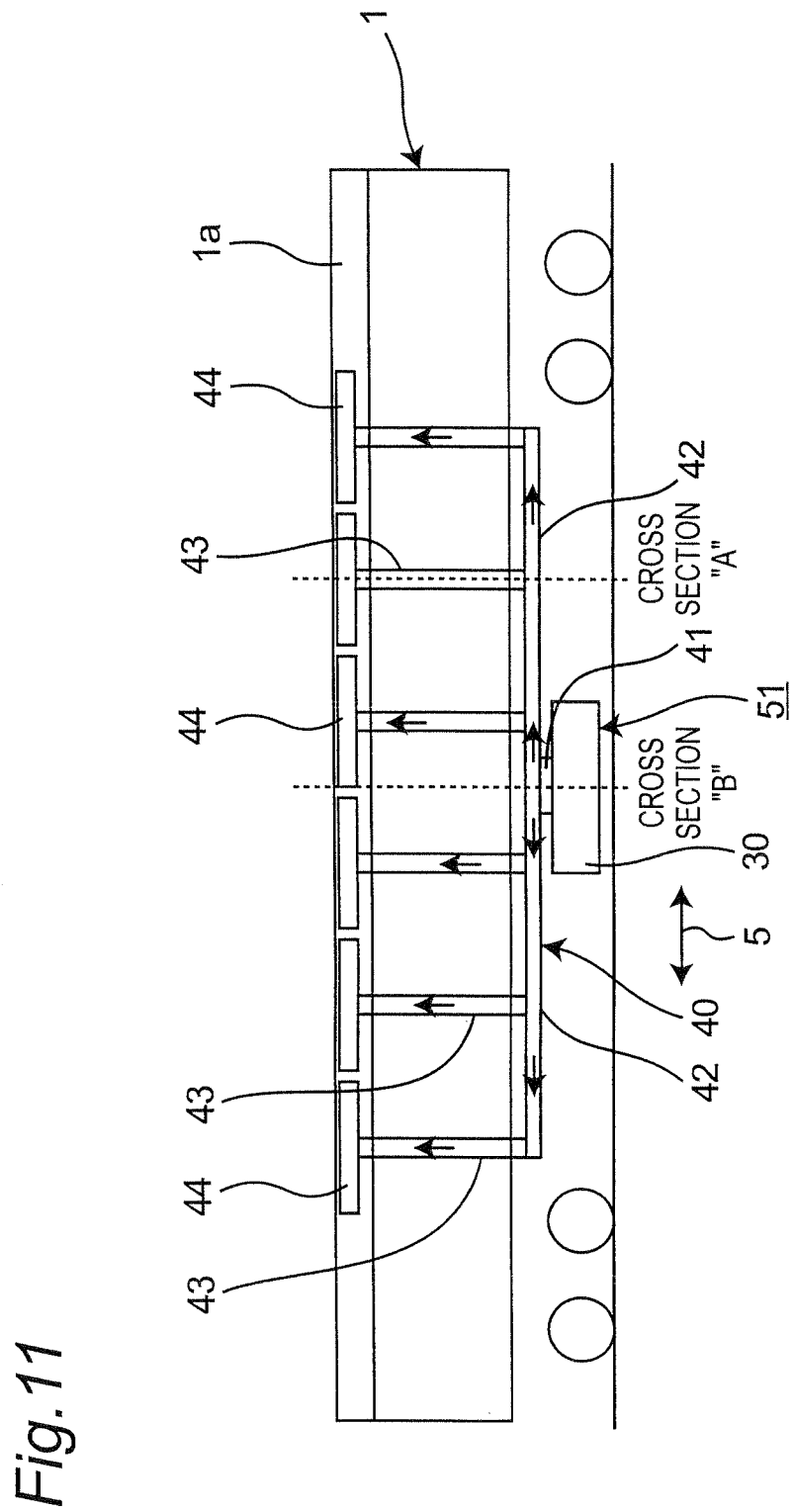
FIG. 11 is a diagram illustrating the schematic structure of another example of the conventional typical air-conditioning system in a railcar.
Figure 12:
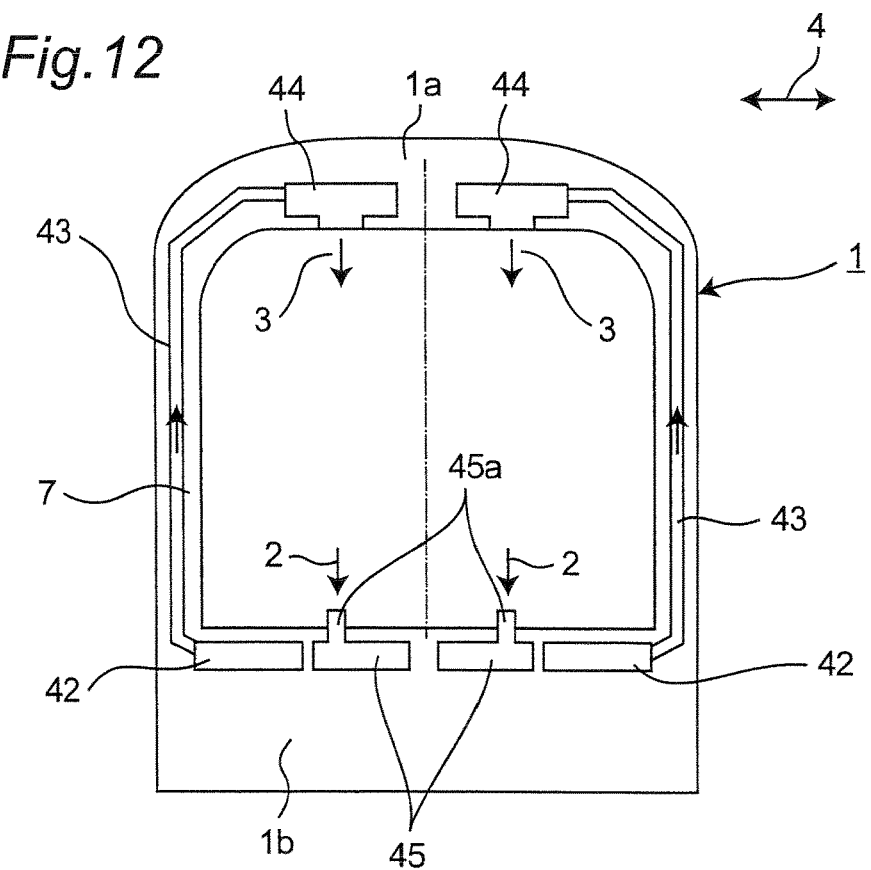
FIG. 12 is a cross-sectional view taken along cross section "A" indicated in FIG. 11.
Figure 13:
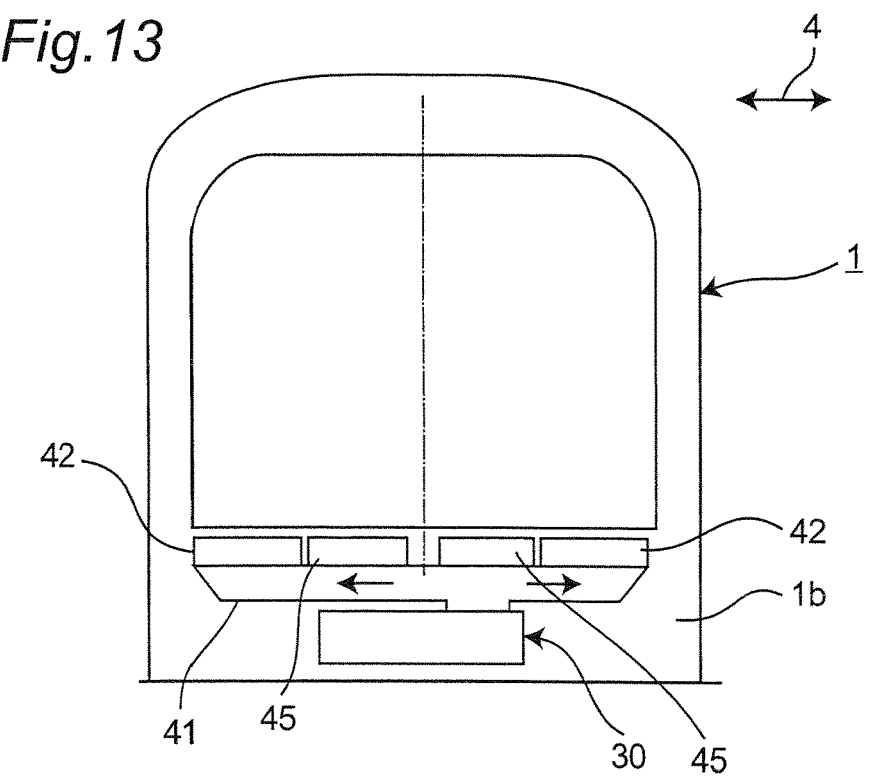
FIG. 13 is a cross-sectional view taken along cross section "B" indicated in FIG. 11.

FIGS. 11 to 13 illustrate an example of the air-conditioning system 51 in the railcar, in which the air conditioner 30 is arranged in an underfloor portion 1b of the railcar 1. In this example, a duct 40 has an underfloor duct 41, an intra-floor duct 42, a rising duct 43, a ceiling duct 44, and a returning duct 45. Here, the underfloor duct 41 is connected to the air conditioner 30 disposed in the underfloor portion 1b, and supplies the conditioned air 3 discharged from the air conditioner 30 to the intra-floor ducts 42. The intra-floor ducts 42 are arranged in the floor of the carbody on the right and left sides in the vehicle width direction 4, and are extended in the vehicle length direction 5. The rising ducts 43 are connected to the intra-floor ducts 42, and extend along right and left side body structures 7 of the carbody to the ceiling of the carbody. The rising ducts 43 are arranged at defined intervals in the vehicle length direction 5. The ceiling ducts 44 are arranged on the right and left sides of the ceiling part 1a of the carbody, and are connected to the rising ducts 43 to be extended in the vehicle length direction 5. The ceiling ducts 44 have outlets which discharge the conditioned air 3 supplied from the air conditioner 30 through the underfloor duct 41, the intra-floor ducts 42, and the rising ducts 43, into the interior.

The returning ducts 45 are extended through the floor of the carbody to guide the interior air 2 to the air conditioner 30 disposed in the underfloor portion 1b, and have, in the seat floor portions in the interior, suction openings 45a for sucking the interior air 2.

First Embodiment

An air-conditioning system in vehicle of this embodiment basically adopts the structure of the air-conditioning system 50 or 51 in the railcar as described above, however is different from the air-conditioning systems 50 and 51 in a point that it has a characteristic structure described below.

That is, as illustrated in FIG. 1, an air-conditioning system 101 in the railcar of this embodiment is installed in the railcar 1 in which a vehicle body center position 10 and an aisle center position 11 are different due to the difference of the number of seat rows on the right and left sides across an aisle 9 in the vehicle width direction 4. In this embodiment, as illustrated, an example is adopted, in which seats 6 include three-row seating on the left side and two-row seating on the right side across the aisle 9 in the vehicle width direction 4. However, the number of seat rows is not limited to this, and for example, may include two-row seating and one-row seating. The plural seats 6 are arranged along the vehicle length direction 5. Further, the air-conditioning system 101 in the railcar has the air conditioner 30 with the structure mentioned above. In the air-conditioning system 101 in the railcar, similar to the structure illustrated in FIG. 8, the air conditioners 30 are arranged at both ends of the ceiling part 1a of the carbody in the vehicle length direction 5, and the ducts 40 are extended from the air conditioners 30 in the vehicle length direction 5 in the ceiling part 1a. The ducts 40 are mounted on both sides in the vehicle width direction 4. Each air conditioner 30 substantially equally discharges the conditioned air 3 to the ducts 40 on both sides.

The air-conditioning system 101 with the above structure in the railcar has a first outlet 111, a second outlet 112, and an air regulating member 120, as the characteristic components thereof.

The first and second outlets 111 and 112 are openings which are respectively provided to the right and left ducts 40 extended from the respective air conditioners 30, and discharge the conditioned air 3 from the air conditioners 30 into the interior of the railcar. Also, the first and second outlets 111 and 112 are continuously opened in the vehicle length direction 5 along the right and left ducts 40. Here, for convenience of explanation, the first outlet 111 is provided above the three-row seating side and the second outlet 112 is provided above the two-row seating side. The first outlet 111 and the second outlet 112 are arranged at left-right symmetric positions in the vehicle width direction 4 with respect to the vehicle body center position 10 and each of which discharges the conditioned air 3 with substantially the same air volume into the interior.

As explained above, in the air-conditioning system 101 in the railcar of this embodiment, the structure of the air conditioners 30 or the ducts 4 does not differ between the right and left sides in the vehicle width direction 4, and each of the first outlet 111 and the second outlet 112 discharges the conditioned air 3 with an equal or substantially equal volume.

Therefore, in the air-conditioning system 101 in the rail car of this embodiment, it can be suppressed to increase the number of types of manufacturing components for air conditioning and to occur the erroneous mounting with the right and left sides reversed during installation. In addition, even if the erroneous mounting is caused, replacement can be easily done from the interior. Further, noise can be prevented from being caused, and additional control may not be provided. Therefore, the air-conditioning system 101 in the railcar is an advantageous system in cost, performance, and installation space.

As illustrated in FIG. 2, the air regulating member 120 is a member arranging a merging position 115 to a position where the line segment connecting the vehicle body center position 10 and the aisle center position 11 is internally divided, the merging position being a position where air flows 3a and 3b from the first outlet 111 and the second outlet 112 are joined. Here, the air flow 3a is discharged from the first outlet 111 into the interior, and the air flow 3b is discharged from the second outlet 112 into the interior. In this embodiment, the merging position 115 corresponds to a position where the line segment connecting the vehicle body center position 10 and the aisle center position 11 is internally divided at a ratio of e.g., between 20:80 and 86:14.

By providing the air regulating member 120 which performs the above operation, the air flows 3a and 3b discharged from the first outlet 111 and the second outlet 112 into the interior become descending air flow in a region of the aisle 9 within the interior and flow downward.

In this embodiment, the air regulating member 120 corresponds to air regulation plates 121 and 122 attached to the first outlet 111 and the second outlet 112 respectively. Each of the air regulation plates 121 and 122 is of strip-shaped plate materials, and continuously extends along the vehicle length direction 5 at the first outlet 111 and the second outlet 112.

Figure 3A:
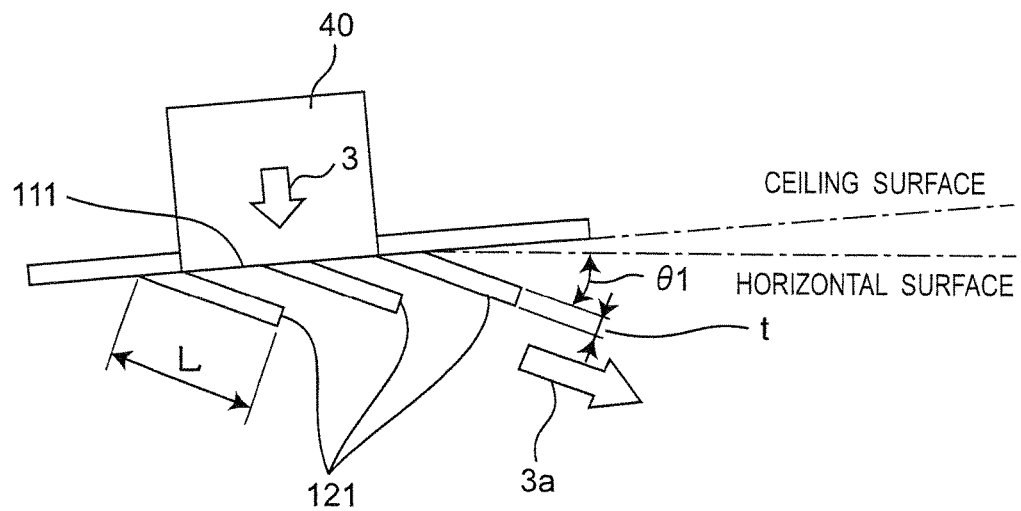
FIG. 3A is a detailed diagram of one regulation plate illustrated in FIG. 1.
Figure 3B:
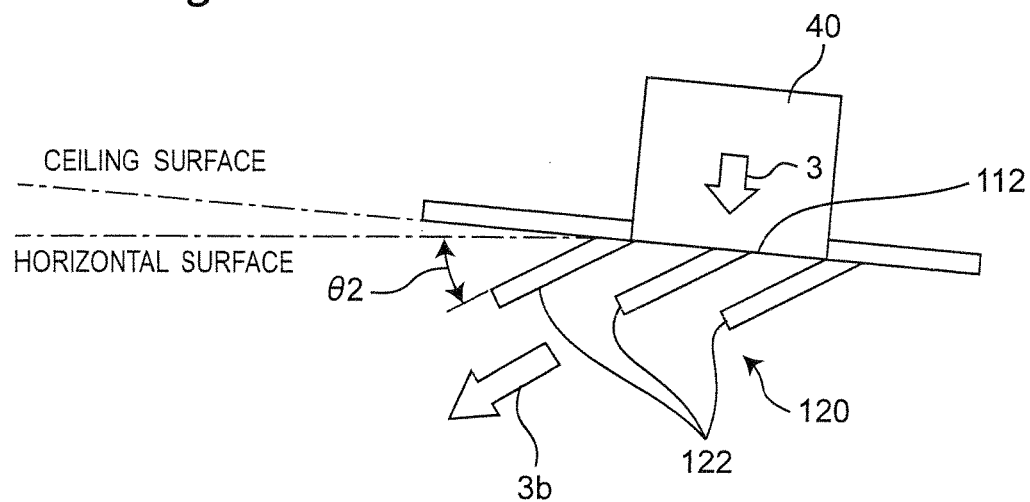
FIG. 3B is a detailed diagram of the other regulation plate illustrated in FIG. 1.

In order to adjust the merging position 115 to the above internally dividing position by the air regulation plates 121 and 122, in this embodiment, as illustrated in FIGS. 3A and 3B, the air regulation plates 121 and 122 are oriented toward the merging position 115 within the interior respectively, and each of angles of the air regulation plates 121 and 122 with respect to a horizontal direction is differentiated between the first outlet 111 and the second outlet 112. Namely, respective air regulation plates 121 attached to the first outlet 111 are oriented to be tilted at an angle θ1 with respect to the horizontal direction, and respective air regulation plates 122 attached to the second outlet 112 are oriented to be tilted at an angle θ2 with respect to the horizontal direction. The ceiling surface may be horizontal or be tilted with respect to the horizontal surface. FIGS. 3A and 3B show a case that the ceiling surface is tilted.

In this embodiment, when the vehicle body center position 10 is located between the first outlet 111 and the second outlet 112, and the first outlet 111 and the second outlet 112 are arranged in a distance of approximately 1 meter from the vehicle body center position 10 in the vehicle width direction 4, the angle θ1 is e.g., 17° to 22° to be set to, as an example, approximately 20°, and the angle θ2 is e.g., 27° to 41° to be set to, as an example, approximately 30°. Of course, when respective installation positions of the first outlet 111 and the second outlet 112 from the vehicle body center position 10 in the vehicle width direction 4 are changed, the angles θ1 and θ2 are changed accordingly.

As an example, a length L (FIG. 3A) of the air regulation plates 121 and 122 along the discharging direction of the air flows 3a and 3b is approximately 20 mm, and a plate thickness t (FIG. 3A) thereof is approximately 3 mm.

In this embodiment, the air regulation plates 121 and 122 are attached to the first outlet 111 and the second outlet 112. Therefore, as described above, the merging position 115 of the air flows 3a and 3b discharged from the first outlet 111 and the second outlet 112 into the interior can be set to the position where the line segment connecting the vehicle body center position 10 and the aisle center position 11 is internally divided at the above ratio, and for instance, can be arranged slightly toward the aisle center position 11 from the vehicle body center position 10. As already described, conventionally, the air flows relatively have a tendency to be blown to the passengers on the aisle 9 side of the three-row seating. However, according to the air-conditioning system 101 in the railcar of this embodiment, such tendency can be improved, and the conditioned air is not directly blown onto the passengers on the aisle seats in the right and left sides across the aisle so that uncomfortable feeling can be prevented.

In this embodiment, the air regulation plates 121 and 122 are projected into the interior from the first outlet 111 and the second outlet 112. However, the air regulation plates 121 and 122 may be attached into the first outlet 111 and the second outlet 112 without being projected. In addition, the first outlet 111 may be integrated with the air regulation plates 121, and the second outlet 112 may be integrated with the air regulation plates 122.

Further, in order to arrange the merging position 115 at the above internally dividing position, in this embodiment, as described above, the angles θ1 and θ2 are changed. However, the embodiment is not limited to this, and at least one of the parameters of the angle, length L, thickness t, and the number of the air regulation plates 121 and 122 may be changed.

Figure 4:
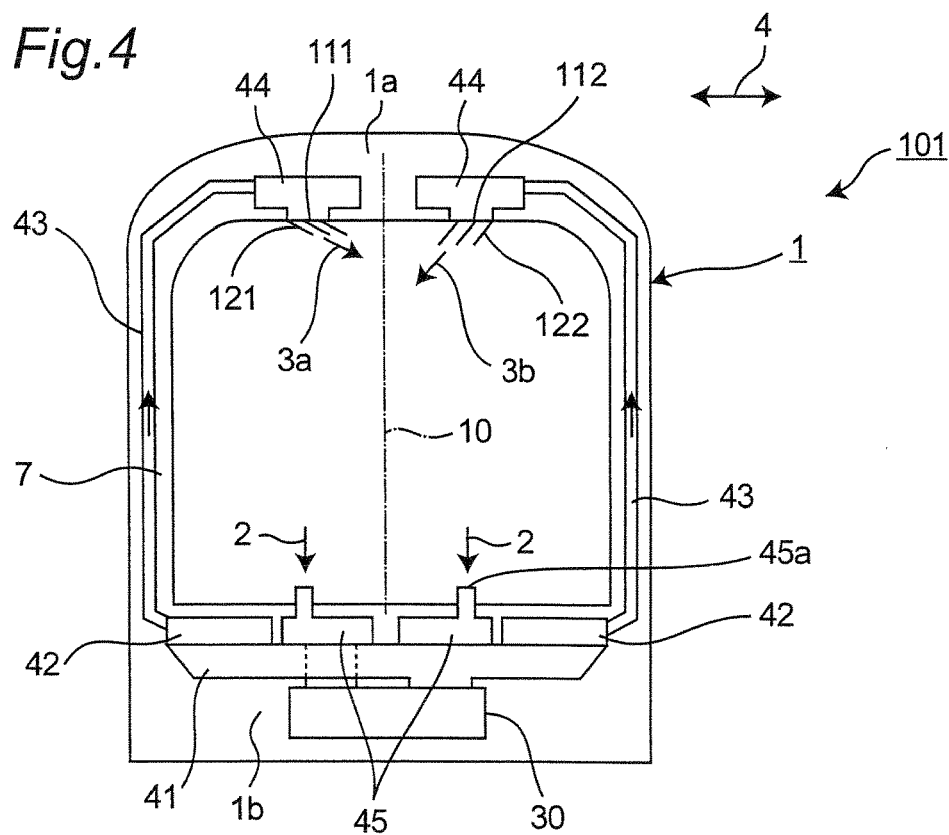
FIG. 4 is a diagram illustrating the schematic structure of another example of the air-conditioning system in vehicle illustrated in FIG. 1.

Further, as illustrated in FIG. 4, the air conditioner 30 may be installed in the underfloor portion 1b, not in the ceiling part 1a of the interior. In this case, as already explained, the conditioned air 3 discharged from the air conditioner 30 passes through the underfloor duct 41, the intra-floor ducts 42, the rising ducts 43, and the ceiling ducts 44, and then is discharged from the first outlet 111 and the second outlet 112 provided at the ceiling ducts 44 through the air regulation plates 121 and 122 into the interior. The interior air 2 is sucked through the suction openings 45a provided at the floor portion of the seats 6, and is returned into the air conditioner 30 through the returning ducts 45.

Figure 5:
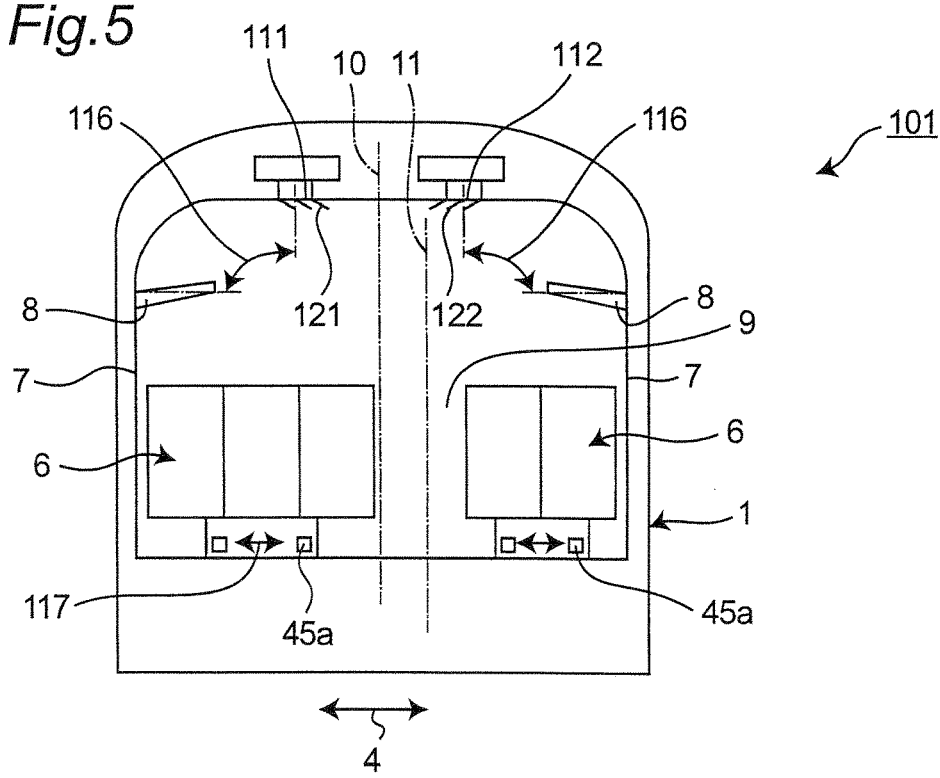
FIG. 5 is a diagram explaining the positions where the outlets and suction openings can be arranged in the air-conditioning system in vehicle illustrated in FIGS. 1 and 4.

Further, as illustrated in FIG. 5, the first outlet 111 and the second outlet 112 can be arranged at left-right symmetric positions with respect to the vehicle body center position 10 in an outlet section 116 between the ceiling part 1a of the interior above the seats 6 and each of upper surfaces baggage racks 8. Here, each of the baggage racks 8 is projected from the right and left side body structures 7 of the railcar 1 in the vehicle width direction 4 toward the interior, and is extended in the vehicle length direction 5. In a case that the air conditioner 30 is installed in the underfloor portion 1b, the suction openings 45a can be arranged in suction opening sections 117 between the aisle 9 side and the window side of the seats 6.

When the suction openings 45a are arranged in the suction opening sections 117, they are arranged, for example, at positions equidistant or substantially equidistant from the aisle center position 11. This arrangement of the suction openings at the positions makes an air flow position of the conditioned air set to the aisle center position 11 by equalizing the suction force on the right and left sides of the carbody, seen from the aisle center position 11.

As described above, according to the air-conditioning system 101 in the railcar of the first embodiment, the configurations related to the air conditioner 30 and the ducts 40 are not different on the right and left sides, but are arranged to be the same on the right and left sides. Thus, as described above, the air-conditioning system 101 in the railcar is advantageous in cost, performance, and installation space. Based on these, simply by providing the air regulating members 120, the conditioned air is not directly blown to the passengers so that uncomfortable feeling can be prevented.

Second Embodiment

Figure 6:
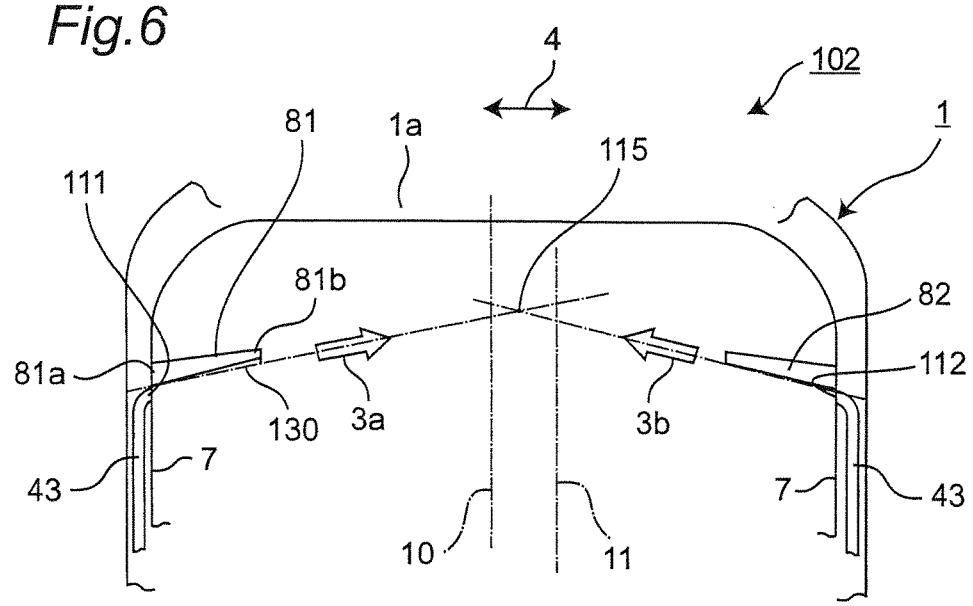
FIG. 6 is a diagram illustrating the schematic structure of an example of an air-conditioning system in vehicle in a second embodiment.

In the first embodiment, the air regulation plates 121 and 122 are used as the air regulating member 120. In an air-conditioning system 102 in the railcar of a second embodiment, the baggage racks 8 are used as the air regulating member 120. In addition, in the air-conditioning system 102 in the railcar the second embodiment, the air conditioner 30 is arranged in the underfloor portion 1b, and as illustrated in FIG. 6, the first outlet 111 and the second outlet 112 are disposed at positions corresponding to the lower surfaces of the baggage racks 8 in the right and left side body structures 7 of the railcar 1. Further, the suction openings 45a which suck the interior air 2 are disposed at the floor portion of the seats 6. In this formation, for instance, as described above, the suction openings 45a can be positioned equidistant or substantially equidistant from the aisle center position 11. The first outlet 111 and the second outlet 112 may be arranged corresponding to the rising ducts 43 provided at defined intervals in the vehicle length direction 5, as illustrated in FIG. 11, or may be continuously arranged so that the respective outlets provided at every rising duct 43 are communicated with each other in the vehicle length direction 5.

Other configuration of the air-conditioning system 102 in the railcar is the same as the air-conditioning system 101 in the railcar described above. Thus, the description of the same configuration is omitted here.

In the air-conditioning system 102 in the railcar of the second embodiment, the air regulating member 120 corresponds to the right and left baggage racks 8 in the vehicle width direction 4, and one baggage rack 8 has a lower surface having a shape different from a lower surface of the other baggage rack 8. As illustrated in FIG. 6, in the second embodiment, the air regulating member 120 is one baggage rack 81 which has a lower surface 130 different from a lower surface of the other baggage rack 82. Here, the baggage rack 81 is the baggage rack 8 located on the far side of the aisle center position 11 in the vehicle width direction 4.

The baggage rack 81 has the lower surface 130 of a baggage rack whose cross section in the vehicle width direction 4 is a wedge-shaped cross section. Here, a thickness of the wedge-shaped cross section is gradually increased from a base 81a of the baggage rack 81 toward a distal end 81b of the baggage rack 81. Here, the base 81a corresponds to one of attaching portions where the baggage racks are attached on the right and left side structure body 7. The lower surface 130 of the baggage rack 81 is continuously provided on the baggage rack 81 along the vehicle length direction 5.

As explained, by using the lower surface 130 of the baggage rack 81 as the air regulating member 120, as the description with reference to FIG. 2 in the first embodiment, the merging position 115 of the air flows 3a and 3b discharged from the first outlet 111 and the second outlet 112 can be arranged to the position where the line segment connecting the vehicle body center position 10 and the aisle center position 11 is internally divided, e.g., at the ratio of between 20:80 and 86:14, as described above.

Therefore, in the air-conditioning system 102 in the railcar of the second embodiment, the conditioned air 3 cannot be directly blown to the passengers sitting on the aisle seats in the right and left sides across the aisle so that uncomfortable feeling can be prevented.

As described above, in the second embodiment, the lower surface 130 as the air regulating member 120 is the lower surface of the baggage rack 81 located on the opposite side of the aisle center position 11 with respect to the vehicle body center position 10. However, in order to arrange the merging position 115 to the internally dividing position mentioned above, the baggage rack 82 located on the aisle center position 11 side may have a lower surface different from the lower surface 130 of the baggage rack 81.

Figure 7:
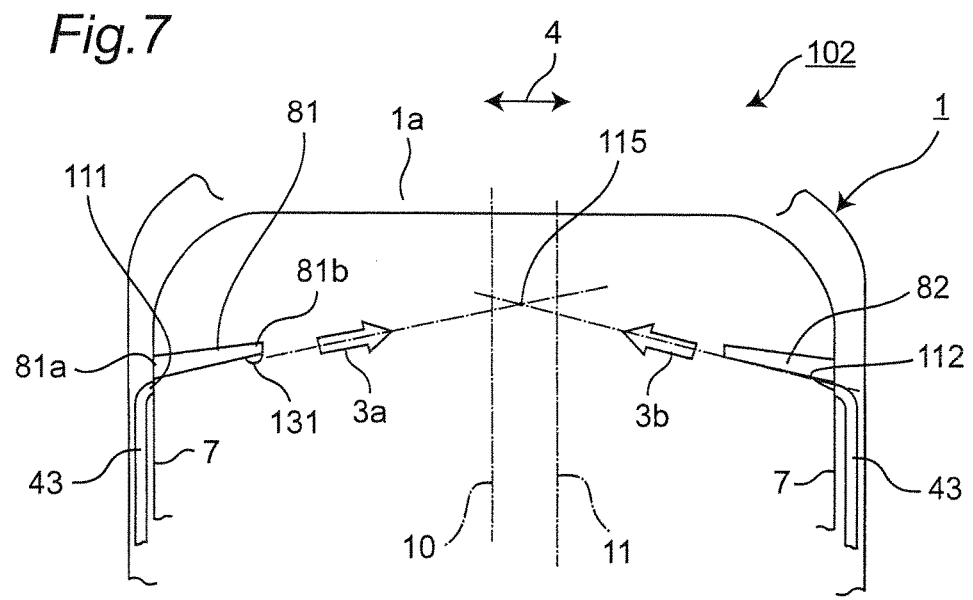
FIG. 7 is a diagram illustrating a modification of the air-conditioning system in vehicle illustrated in FIG. 6.

Also, in the above explanation, the entire lower surface of the baggage rack 81 corresponds to the air regulating member 120. However, as illustrated in FIG. 7, a projection 131 projected downward may be provided as the air regulating member 120 only on a lower surface of the distal end 81b of the baggage rack 81. The projection 131 is continuously provided in the vehicle length direction 5 along the lower surface of the baggage rack 81.

By the projection 131, the merging position 115 of the air flows 3a and 3b discharged from the first outlet 111 and the second outlet 112 into the interior can also be arranged to the position where the line segment connecting the vehicle body center position 10 and the aisle center position 11 is internally divided at the ratio of between 20:80 and 86:14, as described above. That is, the merging position 115 is located between the vehicle body center position 10 and the aisle center position 11, and a ratio of a first distance to a second distance ranges from 0.2 to 0.86. The first distance is a distance between the vehicle body center position 10 and the merging position 11, and the second distance is a distance between the vehicle body center position 10 and the aisle center position 11. Therefore, the conditioned air 3 cannot be directly blown to the passengers sitting on the aisle seats in the right and left sides across the aisle, so that uncomfortable feeling in them can be prevented.

The lower surface 130 and the projection 131 may be established as a member different from the baggage rack 81 or integrated with the baggage rack 81.

As described in the first embodiment, the suction openings 45a which suck the interior air 2 can be arranged in the suction opening sections 117 from the aisle 9 side to the window side of the seats 6 in the floor portion of the seats 6. In this case, as described above, the suction openings 45a can be arranged in the lower portion of the seats 6 to be equidistant or substantially equidistant from the aisle center position 11.

In the structure in which as illustrated in FIG. 6, the first outlet 111 and the second outlet 112 are provided at the positions corresponding to the lower surfaces of the baggage racks 8 in the right and left side body structures 7 of the railcar 1 and the suction openings 45a which suck the interior air 2 are disposed at the floor portion of the seats 6, in place of the configuration with the lower surface 130 and the projection 131 as described above, the air regulation plates 121 and 122 described in the first embodiment may be attached to the first outlet 111 and the second outlet 112.

Such a structure can also obtain the same effect as described above.

In the above embodiments, one aisle 9 is provided. However, the air-conditioning systems in the above embodiments are not limited to the one aisle, and are applicable to a vehicle, such as an aircraft and a ship, having two or more aisles. In a case with two or more aisles, the air regulating member 120 may be provided so that the air flows are merged in respective internally dividing points of line segments connecting respective aisle center positions 11 and the vehicle body center position 10.

Further, by combining the above embodiments, their respective effects can be exhibited.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of JP No. 2012-285030 filed on Dec. 27, 2012, including specification, drawings, claims, and summary is incorporated herein by reference in its entirety.

INDUSTRIAL APPLICABILITY

The present invention is applicable to an air-conditioning system in vehicle in a large-sized transportation, such as a railcar, an aircraft, a ship, and a bus, and is applicable to a railcar equipped with the same.

DESCRIPTION OF REFERENCE SYMBOLS

1 RAILCAR,
1a INTERIOR CEILING PART,
2 INTERIOR AIR,
3 CONDITIONED AIR,
4 VEHICLE WIDTH DIRECTION,
5 VEHICLE LENGTH DIRECTION,
6 SEAT,

7 RIGHT AND LEFT SIDE BODY STRUCTURE,
8 BAGGAGE RACK,
10 VEHICLE BODY CENTER POSITION,
11 AISLE CENTER POSITION,
30 AIR CONDITIONER,
45a SUCTION OPENING,
101, 102 AIR-CONDITIONING SYSTEM IN RAILCAR,
111 FIRST OUTLET,
112 SECOND OUTLET,
115 MERGING POSITION,
120 AIR REGULATING MEMBER,
121, 122 AIR REGULATION PLATE,
130 LOWER SURFACE, and
131 PROJECTION.

The invention claimed is:

1. An air-conditioning system in vehicle with an air conditioner, the air conditioner sucking interior air of the vehicle and discharging conditioned air regulated in temperature into the interior of the vehicle, the vehicle having a vehicle body center position and an aisle center position, the vehicle body center position and the aisle center position being different from each other by the difference of the number of seat rows on the right and left sides across an aisle in a vehicle width direction, the air-conditioning system comprising:
a first outlet and a second outlet configured to be arranged at left-right symmetric positions in the vehicle width direction with respect to the vehicle body center position, each of the first outlet and the second outlet being configured to discharge the conditioned air with substantially the same air volume into the interior; and
a first set of regulation plates disposed at the first outlet and a second set of regulation plates disposed the second outlet, wherein the first and second set of air regulation plates are configured to discharge air downwardly from the first outlet and the second outlet such that:
a merging position of the downward air flow from the first outlet and the second outlet is a position that divides a line segment connecting the vehicle body center position and the aisle center position; and
the merging position is arranged between the vehicle body center position and the aisle center position, wherein:
the first outlet is configured to be arranged on a side with many seat rows in the vehicle width direction, and the second outlet is configured to be arranged on a side with fewer seat rows in the vehicle width direction, and
an orientation angle with respect to a horizontal plane of all of the first set of regulation plates arranged at the first outlet is smaller than an orientation angle with respect to the horizontal plane of all of the second set of regulation plates arranged at the second outlet.

2. The air-conditioning system according to claim 1, wherein the merging position divides the line segment connecting the vehicle body center position and the aisle center position at a ratio of between 20:80 and 86:14.

3. The air-conditioning system according to claim 1, wherein:
the first and second set of air regulation plates are arranged such that at least one of: a length of one of the first set of air regulation plates and the second set of air regulation plates in an air discharging direction; a thickness of one of the first set of air regulation plates and the second set of air regulation plates; and the number of one of the first set of air regulation plates and the second set of air regulation plates is different from that of the other of the first set of air regulation plates and the second set of air regulation plates.

4. The air-conditioning system according to claim 1, further comprising:
baggage racks configured to be projected toward the interior on the right and left sides of the vehicle and to be extended in a vehicle length direction,
wherein the first outlet and the second outlet are arranged at left-right symmetric positions with respect to the vehicle body center position in a section between a ceiling part of the interior and each of upper surfaces of baggage racks.

5. The air-conditioning system in vehicle according to claim 1, further comprising:
at least two interior air suction openings configured to be arranged at lower portions of seats across the aisle and be positioned substantially equidistant from the aisle center position.

6. The air-conditioning system according to claim 1, wherein the merging position is located between the vehicle body center position and the aisle center position, and
a ratio of a first distance to a second distance ranges from 0.2 to 0.86, the first distance is a distance between the vehicle body center position and the merging position, and the second distance is a distance between the vehicle body center position and the aisle center position.

7. A railcar comprising the air-conditioning system in vehicle according to claim 1.

8. The air-conditioning system according to claim 1, wherein each of the first and second set of air regulation plates has one end connected to the first outlet or the second outlet and another free end pointing downward and toward the merging position.

9. An air-conditioning system in vehicle with an air conditioner, the air conditioner sucking interior air of the vehicle and discharging conditioned air regulated in temperature into the interior of the vehicle, the vehicle having a vehicle body center position and an aisle center position, the vehicle body center position and the aisle center position being different from each other by the difference of the number of seat rows on the right and left sides across an aisle in a vehicle width direction, the air-conditioning system comprising:
a first outlet and a second outlet configured to be arranged at left-right symmetric positions in the vehicle width direction with respect to the vehicle body center position, each of the first outlet and the second outlet being configured to discharge the conditioned air with substantially the same air volume into the interior;
an air regulating member configured to set a merging position that air flows discharged from the first outlet and the second outlet are joined to a position that a line segment connecting the vehicle body center position and the aisle center position is internally divided such that the merging position is arranged between the vehicle body center position and the aisle center position; and
baggage racks configured to be projected toward the interior on the right and left sides of the vehicle and to be extended in a vehicle length direction,
wherein the first outlet and the second outlet are disposed at the lower sides of the baggage racks, and the air regulating member is a projection provided on a lower surface of one of the right and left baggage racks and oriented downward.

10. An air-conditioning system in vehicle with an air conditioner, the air conditioner sucking interior air of the vehicle and discharging conditioned air regulated in temperature into the interior of the vehicle, the vehicle having a vehicle body center position and an aisle center position, the vehicle body center position and the aisle center position being different from each other by the difference of the number of seat rows on the right and left sides across an aisle in a vehicle width direction, the air-conditioning system comprising:

a first outlet and a second outlet configured to be arranged at left-right symmetric positions in the vehicle width direction with respect to the vehicle body center position, each of the first outlet and the second outlet being configured to discharge the conditioned air with substantially the same air volume into the interior;

an air regulating member configured to set a merging position that air flows discharged from the first outlet and the second outlet are joined to a position that a line segment connecting the vehicle body center position and the aisle center position is internally divided such that the merging position is arranged between the vehicle body center position and the aisle center position; and baggage racks configured to be projected toward the interior on the right and left sides of the vehicle and to be extended in a vehicle length direction, wherein:

the first outlet and the second outlet are disposed at the lower sides of the baggage racks, and the air regulating member is the baggage racks, and one baggage rack has a lower surface in shape different from that of the other baggage rack, wherein the one baggage rack has a wedge-shaped cross section in the vehicle width direction, and a thickness of the wedge-shaped cross section gradually increases in a direction toward the interior of the vehicle.

11. The air-conditioning system according to claim 10, wherein a thickness of the one baggage rack, measured from the lower surface to an upper surface of the baggage rack, is different from that of the other baggage rack.

12. The air-conditioning system according to claim 10, wherein an upper surface of the one baggage rack has the same shape as an upper surface of the other baggage rack.

* * * * *